(12) United States Patent
Deshpande et al.

(10) Patent No.: US 9,330,166 B2
(45) Date of Patent: May 3, 2016

(54) USER-SPECIFIC SEARCH OVER PROTECTED CONTEXTUAL DATA

(71) Applicant: International Business Machines Corporation, Armonk, NY (US)

(72) Inventors: Prasad M. Deshpande, Bangalore (IN); Salil R. Joshi, Bangalore (IN); Mukesh Kumar Mohania, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 14/077,931

(22) Filed: Nov. 12, 2013

(65) Prior Publication Data

US 2015/0134648 A1   May 14, 2015

(51) Int. Cl.
*G06F 17/30* (2006.01)
*G06F 21/62* (2013.01)

(52) U.S. Cl.
CPC .... *G06F 17/30699* (2013.01); *G06F 17/30554* (2013.01); *G06F 21/6209* (2013.01); *G06F 21/6218* (2013.01); *G06F 21/6245* (2013.01)

(58) Field of Classification Search
CPC .......... G06F 17/30699; G06F 21/6209; G06F 21/6218; G06F 21/6245
See application file for complete search history.

(56) References Cited

U.S. PATENT DOCUMENTS

| 6,505,190 | B1* | 1/2003 | Harel et al. | 707/754 |
|---|---|---|---|---|
| 7,428,701 | B1 | 9/2008 | Gavin et al. | |
| 7,720,783 | B2 | 5/2010 | Staddon et al. | |
| 7,831,571 | B2 | 11/2010 | Roy et al. | |
| 8,429,740 | B2 | 4/2013 | Sokolan et al. | |
| 2010/0131551 | A1* | 5/2010 | Benzaken et al. | 707/769 |
| 2011/0066606 | A1 | 3/2011 | Fox et al. | |
| 2011/0119576 | A1 | 5/2011 | Aumann | |
| 2011/0265177 | A1* | 10/2011 | Sokolan et al. | 726/19 |
| 2012/0233209 | A1 | 9/2012 | Cheng et al. | |
| 2013/0144901 | A1 | 6/2013 | Ho et al. | |

FOREIGN PATENT DOCUMENTS

WO   WO2010059584 A1   5/2010

OTHER PUBLICATIONS

Nettleton, David F., and Daniel Abril. "Document sanitization: Measuring search engine information loss and risk of disclosure for the wikileaks cables." Privacy in Statistical Databases. Springer Berlin Heidelberg, 2012.*

Staddon, Jessica, Philippe Golle, and Bryce Zimny. "Web-Based Inference Detection." USENIX Security. 2007.*

(Continued)

*Primary Examiner* — William Spieler
(74) *Attorney, Agent, or Firm* — Ference & Associates LLC (57) ABSTRACT

Methods and arrangements for facilitating a display of search results. A search query is received from a user having a predetermined access level. A search is executed based on the search query and, based on the executed search, initial search results are produced. Sensitive information is redacted from the initial search results, based on the predetermined access level. The redacted search results are filtered and re-ordered to forestall an inference of the redacted sensitive information. The filtered and re-ordered search results are displayed to a user. Other variants and embodiments are broadly contemplated herein.

20 Claims, 5 Drawing Sheets

(56) References Cited

OTHER PUBLICATIONS

IBM, Online Product Guide, "InfoSphere Guardium Data Redaction," Available at URL: http://www-03.ibm.com/software/products/us/en/infoguardatareda/, accessed Oct. 9, 2013, 2 pages.

Aditya, B. et al, "Banks: Browsing and Keyword Searching in Relational Databases," Proceedings of the 28th VLDB Conference, Hong Kong, China, Aug. 20-23, 2002, 4 pages, IEEE Digital Library.

Agrawal, Sanjay et al, "DBXplorer: A System for Keyword-Based Search over Relational Databases," Proceedings of the 18th International Conference on Data Engineering (ICDE), San Jose, California, United States, Feb. 26, 2002-Mar. 1, 2002, 12 pages, IEEE Digital Library.

Hristidis, Vagelis et al, "Discover: Keyword Search in Relational Databases," Proceedings of the 28th VLDB Conference, Hong Kong, China, Aug. 20-23, 2002, 12 pages, IEEE Digital Library.

Chakaravarthy, Venkatesan T., et al, "Efficient Techniques for Document Sanitization," Conference on Information and Knowledge Management, Napa Valley, California, United States, Oct. 26-30, 2008, 10 pages, ACM Digital Library.

* cited by examiner

```
Given, the user U and the query Q and a set of documents/records {d₁, d₂, ..., dₙ}
Create a binary formula B_Q for Q
for d ∈ S_Q do                          % S_Q is the set of documents in the search result
    for t_i ∈ Q do                      % t_i are the terms in the original query Q
        if t_i ∈ d then                 % track the terms which existed in the document
            b_i ← TRUE
        else
            b_i ← FALSE
        end if
    end for
    for t_i ∈ Q do
        if t_i ∈ R_U^d then              % R_U^d is the set of terms redacted from document d for user U
            b_i ← FALSE
        end if
    end for
    if B_Q == TRUE then
        S_Q^U ← S_Q^U ⊔ d^U              % Add d^U to the set of 'valid' documents which should be visible to the user
    else
        continue                         %Hide the redacted document/record d^U from user U
    end if
end for
Reorder S_Q^U as per the default ranking formula
```

USER-SPECIFIC SEARCH OVER PROTECTED CONTEXTUAL DATA

BACKGROUND

Generally, contextual information relating to business or other entities could be present in structured sources as well as documents. Access control and redaction mechanisms are typically used to protect this information.

On structured data, label-based access control can be used to define the policies that govern access. Similar policies can be enforced on unstructured data, by identifying sensitive data based on the user accessing the document and redacting it. However, keyword searching on such protected data can lead to an inadvertent leakage of information, even if sensitive information is hidden in the results.

BRIEF SUMMARY

In summary, one aspect of the invention provides a method of facilitating a display of search results, the method comprising: utilizing at least one processor to execute computer code configured to perform the steps of: receiving a search query from a user having a predetermined access level; executing a search based on the search query; producing initial search results based on the executed search; redacting sensitive information from the initial search results based on the predetermined access level; filtering and re-ordering the redacted search results to forestall an inference of the redacted sensitive information; and displaying to a user the filtered and re-ordered search results.

Another aspect of the invention provides an apparatus for facilitating a display of search results, the apparatus comprising: at least one processor; and a computer readable storage medium having computer readable program code embodied therewith and executable by the at least one processor, the computer readable program code comprising: computer readable program code configured to receive a search query from a user having a predetermined access level; computer readable program code configured to execute a search based on the search query; computer readable program code configured to produce initial search results based on the executed search; computer readable program code configured to redact sensitive information from the initial search results based on the predetermined access level; computer readable program code configured to filter and re-order the redacted search results to forestall an inference of the redacted sensitive information; and computer readable program code configured to display to a user the filtered and re-ordered search results.

An additional aspect of the invention provides a computer program product for facilitating a display of search results, the computer program product comprising: a computer readable storage medium having computer readable program code embodied therewith, the computer readable program code comprising: computer readable program code configured to receive a search query from a user having a predetermined access level; computer readable program code configured to execute a search based on the search query; computer readable program code configured to produce initial search results based on the executed search; computer readable program code configured to redact sensitive information from the initial search results based on the predetermined access level; computer readable program code configured to filter and re-order the redacted search results to forestall an inference of the redacted sensitive information; and computer readable program code configured to display to a user the filtered and re-ordered search results.

A further aspect of the invention provides a method comprising: receiving a search query from a user with a given access level; executing a search based on the search query; producing search results which omit information relative to the user's access level and which re-order the search results to forestall inference of missing information; the producing comprising: identifying at least one keyword for redaction from the search query, and redacting the at least one keyword from at least one document of the search results; and setting a boolean literal of a search term to true if the search term is present in at least one document of the search results, else setting the boolean literal to false.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 5, whether on a server computer, a client computer, a node computer in a distributed network, or any combination thereof.

Broadly contemplated herein, in accordance with at least one embodiment of the invention, are methods and arrangements which prevent information leakage, as described further above, with minimal overhead in the context of a system.

Generally, in accordance with a context of at least one embodiment of the invention, a search engine (via the Internet, or offline) gathers results based on a supplied query. A query is made up of one or more terms (i.e., keywords) with optional search directives (such as "and"/"or", possibly including "-" to exclude a term from the results). To control the information in the query results based on any access rights of the user querying the system, a document redactor can be employed to mask the sensitive information for unstructured data. (For background purposes, an example of such a redactor can be found in U.S. Pat. No. 7,831,571 to Roy et al.) Returning these redacted documents/records to the user without further filtering can lead to potential information leakage.

Figure 1:
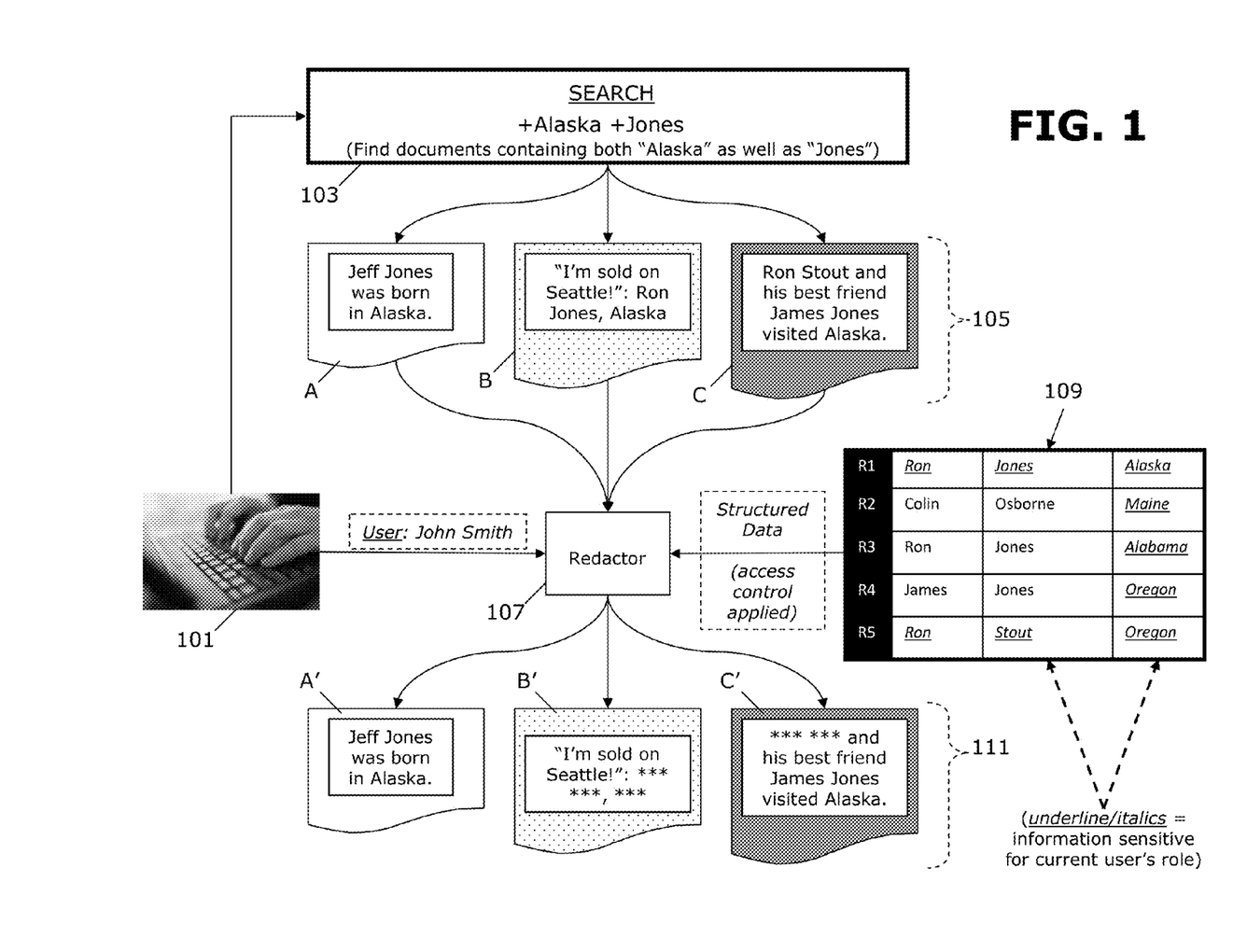
FIG. 1 illustrates execution of a search.

By way of a non-restrictive example illustrating a context of at least one embodiment of the invention, FIG. 1 illustrates a search being executed. As shown, a user at a computer (101) executes a search 103 to find documents containing both of the terms "Alaska" and "Jones". An initial set of results 105 is yielded; just three (A, B, C) are shown here for ease of illustration. Some of the results contain information sensitive for a current user's role, and a redactor 107 serves to sanitize the results, by applying access control as determined by an index of structured data 109, to create an updated set of results 111. In this updated set, sensitive information is blocked out while still permitting the user to see the rest of the document. Sensitive information, as broadly contemplated and discussed herein, can include, inter alia, any information that one or more users with a given predetermined access level does not have permission to view. By way of an illustrative and non-restrictive example, such sensitive information could include be sensitive medical information, such "protected health information" (PHI) relating to a medical patient.

Thus, in accordance with the present example, in accordance with a context of at least one embodiment of the invention, the redactor 107 is made aware of user "John Smith". In consulting the structured data 109, it is determined that with regard to several individuals (here, with regard to all five records, R1-R5, shown in the table of data 109), information on anyone's state of residence is off limits to user John Smith. Further, it is determined that even the names "Ron Jones" (of Alaska) and "Ron Stout" (of Oregon) are off-limits to user Smith. Accordingly, the redactor 107 produces updated results 111. As shown, updated result A' remains intact while "Ron Jones" and "Alaska" are redacted out from result B'. For result C', "Ron Stout" is redacted out.

In accordance with the present example, in accordance with a context of at least one embodiment of the invention, it can be appreciated that sensitive information (for user John Smith) indeed is redacted out successfully. However, it can also be appreciated that in reviewing the results as a whole, it may still be possible for user Smith to make reasonable inferences about information missing from one updated result (B', C') or another. This may be regarded as a form of "information leakage", which methods and arrangements broadly contemplated herein aim to address.

Generally, in accordance with a context of at least one embodiment of the invention, consider a query "term1 AND term2" (i.e., +term1 +term2). In an initial harvesting of results, all the documents/records which satisfy this query will be returned. Accordingly, for the purposes of illustration consider that term1 is sensitive, and is accordingly redacted/ blocked from documents in the search results. Thus, when the user reads the documents (or records), (s)he can deduce the presence of term1 since it was a mandatory term in the query; this indeed can represent a form of information leakage.

Generally, in accordance with a context of at least one embodiment of the invention, let Q represent a query, composed of terms $t_1, t_2, \ldots, t_k$. For example: $Q=(t_1$ AND $(t_2$ OR $t_5))$ OR $t_6$. Let the documents/records present in the system be $D=\{d_1, d_2, \ldots, d_n\}$. For the query Q, a subset of documents, $S_Q$ will match: $S_Q=\{d_i | d_i$ satisfies $Q\}$. Next, a step of redaction filters out certain terms $R_U^d$ from a document/record d based on the role of the user U, where:

$$R_U^d \stackrel{d}{=} \{t_i | (t_i \epsilon d)^\wedge (t_i \text{ is restricted for } U)\}.$$

Then, let $D^U=\{d_1^U, d_2^U, \ldots, d_n^U\}$, where $d_i^U=d_i-R_U^d$, i.e., $D^U$ is the database that the user is permitted to see.

Generally, in accordance with a context of at least one embodiment of the invention, a query Q by a user U should be matched against $D^U$. However, this is inefficient since $D^U$ depends on the user U that is specified at runtime. This makes it difficult to index $D^U$ beforehand. A naïve approach may thus involve simply applying the redaction/filtering on the results over D, i.e., on $S_Q$. However, this can lead to at least one form of information leakage, as touched on above.

Figure 2:
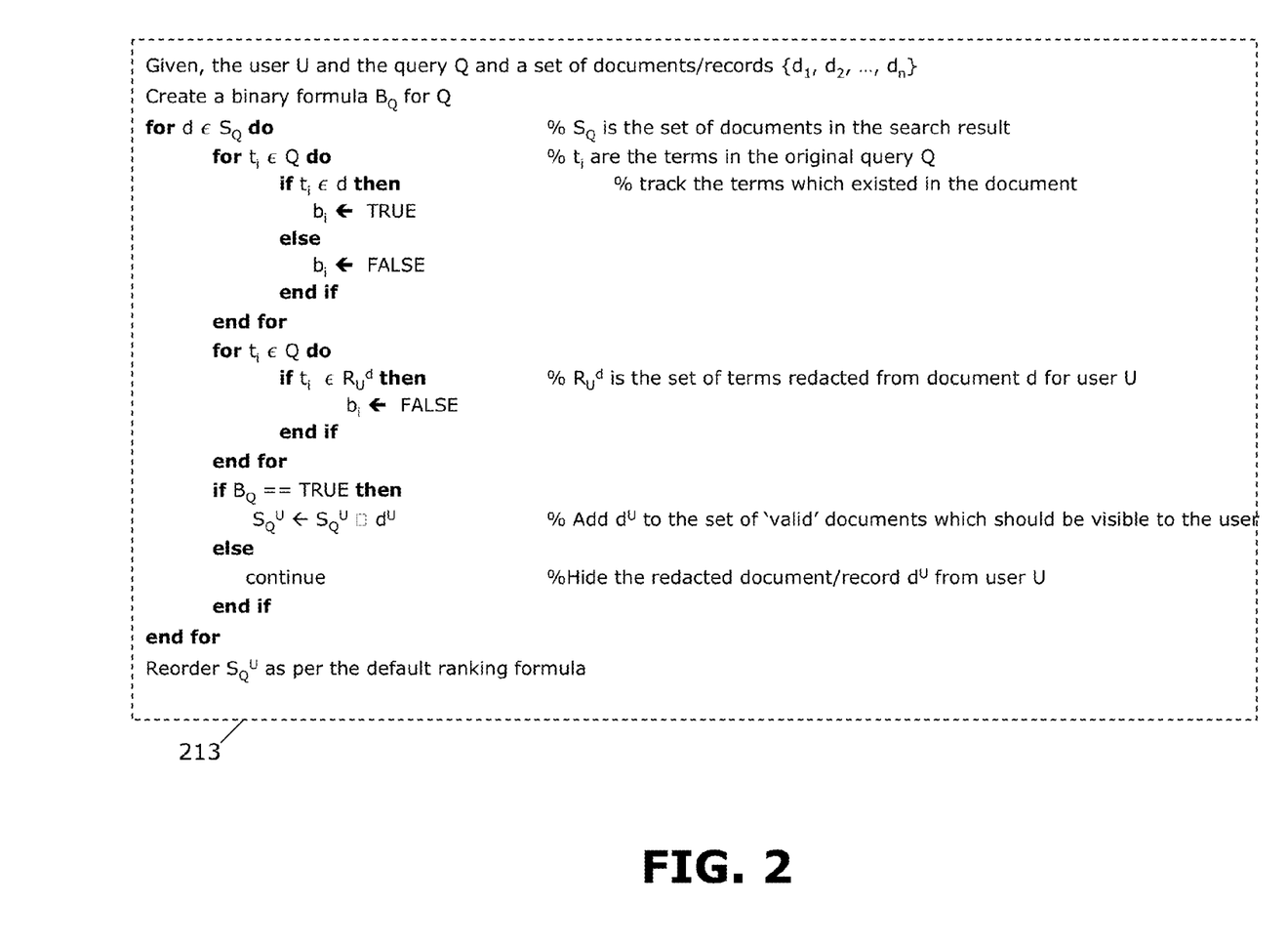
FIG. 2 provides a redacting algorithm.

FIG. 2 provides a redacting algorithm 213, in accordance with at least one embodiment of the invention. As such, there is constructed a binary logic formula $B_Q$ which is equivalent to Q and in which each original term $t_i$ is represented as a boolean literal $b_i$. For example, the earlier query Q can be represented as: $B_Q=(b_1^\wedge(b_2 v b_5))v b_6$. For a document/record d in the query result set, there are identified the redacted keywords $R_U^d$ and form the redacted document $d^U$. If a term $t_i$ was present in d, i.e., $t_i \epsilon d$, $b_i$ is set to TRUE, else it is set to FALSE. If a term $t_i$ in Q was redacted from the document/ record, i.e., $t_i \epsilon R_U^d$, the corresponding $b_i$ is set to FALSE. If $B_Q$ now evaluates to TRUE, the redacted document $d^U$ is added to the final set, $S_Q^U$, else its existence is hidden. $S_Q^U$ is then re-ordered using a default ranking formula, as already used by the base search algorithm, to avoid any inference. It can be shown that $S_Q^U$ is equivalent of running Q on $D^U$.

Figure 3:
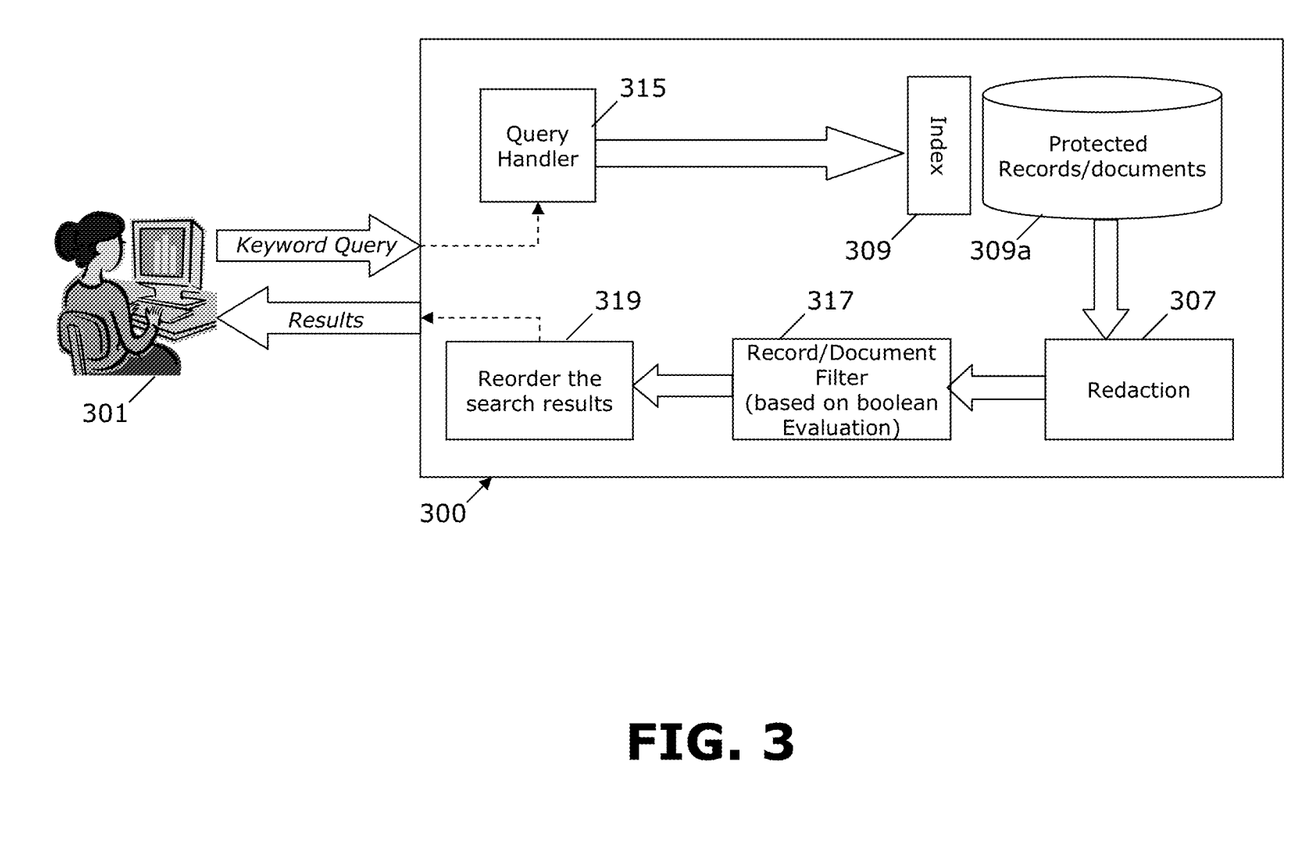
FIG. 3 provides a general flow diagram for a keyword-based retrieval system.

FIG. 3 provides a general flow diagram for a keyword-based retrieval system 300, in accordance with at least one embodiment of the invention. As shown, a computer-based user 301 can send a keyword query to the system 300 and its query handler 315. An index 309 to protected records/documents 309a is then consulted, and a redaction step 307 takes place similarly to the example of FIG. 1. However, at this point, a record/document filter 317 acts to apply the binary logic formula discussed above, and the search results are reordered (319), as also discussed above.

Figure 4:
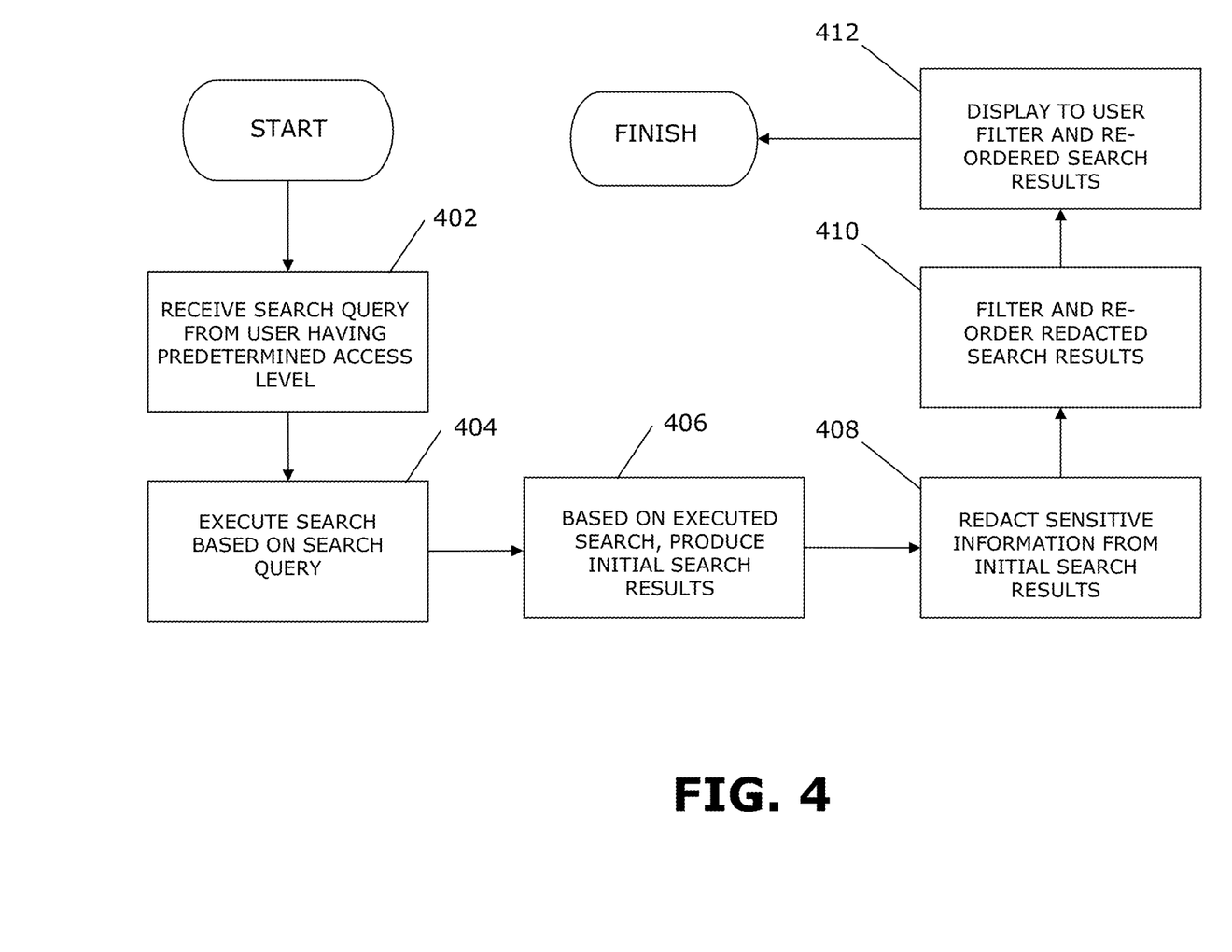
FIG. 4 sets forth a process more generally for facilitating a display of search results.

FIG. 4 sets forth a process more generally for facilitating a display of search results, in accordance with at least one embodiment of the invention. It should be appreciated that a process such as that broadly illustrated in FIG. 4 can be carried out on essentially any suitable computer system or set of computer systems, which may, by way of an illustrative and non-restrictive example, include a system such as that indicated at 12' in FIG. 5. In accordance with an example embodiment, most if not all of the process steps discussed with respect to FIG. 4 can be performed by way of a processing unit or units and system memory such as those indicated, respectively, at 16' and 28' in FIG. 5.

As shown in FIG. 4, in accordance with at least one embodiment of the invention, a search query is received from a user having a predetermined access level (402). A search is executed based on the search query (404) and, based on the executed search, initial search results are produced (406). Sensitive information is redacted from the initial search results, based on the predetermined access level (408). The redacted search results are filtered and re-ordered to forestall an inference of the redacted sensitive information (410). The filtered and re-ordered search results are displayed to a user (412).

Figure 5:
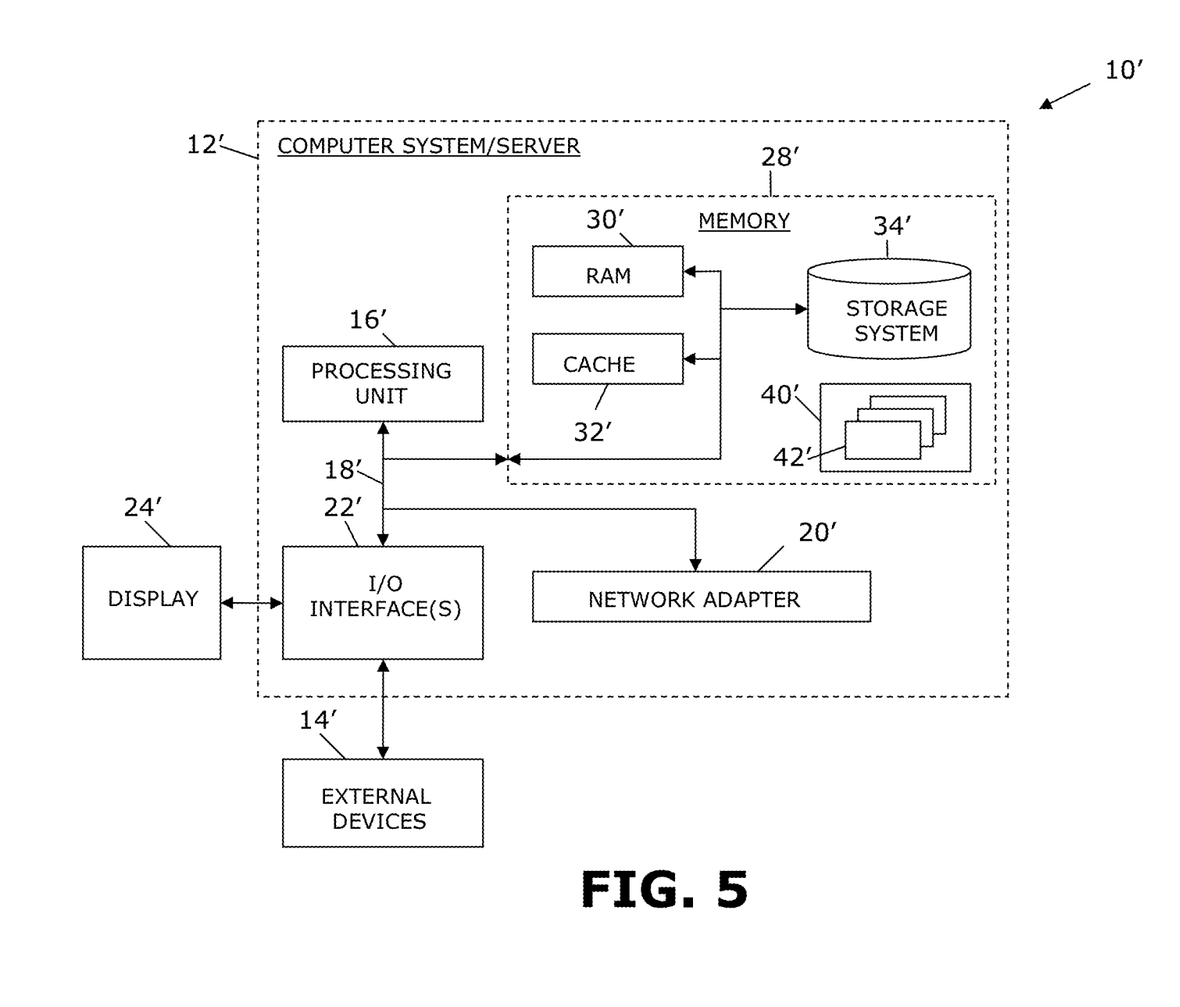
FIG. 5 illustrates a computer system.

Referring now to FIG. 5, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of facilitating a display of search results, said method comprising:
    utilizing at least one processor to execute computer code configured to perform the steps of:
    receiving a search query from a user having a predetermined access level;
    executing a search based on the search query;
    producing initial search results based on the executed search;
    redacting sensitive information from the initial search results based on the predetermined access level;

filtering and re-ordering the redacted search results to forestall an inference of the redacted sensitive information; and displaying to a user the filtered and re-ordered search results.

2. The method according to claim 1, wherein said filtering and re-ordering comprises re-ranking the redacted search results relative to a base search algorithm associated with said executing.

3. The method according to claim 1, wherein said filtering and re-ordering comprises constructing a binary logic formula corresponding to the search query.

4. The method according to claim 3, wherein:
the search query comprises at least one search term;
said constructing comprising representing each of the least one search term as a boolean literal.

5. The method according to claim 4, wherein:
the initial search results comprise at least one document; and
the redacted search results comprise at least one redacted document corresponding to at least one document from the initial search results.

6. The method according to claim 5, wherein said redacting comprises identifying at least one keyword for redaction from the search query, and redacting the at least one keyword from at least one document of the initial search results.

7. The method according to claim 6, wherein said filtering and re-ordering comprises setting a boolean literal of a search term to true if the search term is present in at least one document of the initial search results, else setting the boolean literal to false.

8. The method according to claim 7, wherein said filtering and re-ordering comprises setting a boolean literal of a search term from the search query to false if the search term is redacted from the initial search results.

9. The method according to claim 8, wherein said filtering and re-ordering comprises:
evaluating the binary logic formula; and
adding a redacted document to the redacted search results if the binary logic formula evaluates to true.

10. The method according to claim 9, wherein said filtering and re-ordering comprises hiding the redacted document from the redacted search results if the binary logic formula evaluates to false.

11. An apparatus for facilitating a display of search results, said apparatus comprising:
at least one processor; and
a computer readable storage medium having computer readable program code embodied therewith and executable by the at least one processor, the computer readable program code comprising:
computer readable program code configured to receive a search query from a user having a predetermined access level;
computer readable program code configured to execute a search based on the search query;
computer readable program code configured to produce initial search results based on the executed search;
computer readable program code configured to redact sensitive information from the initial search results based on the predetermined access level;
computer readable program code configured to filter and re-order the redacted search results to forestall an inference of the redacted sensitive information; and
computer readable program code configured to display to a user the filtered and re-ordered search results.

12. A computer program product for facilitating a display of search results, said computer program product comprising:
a computer readable storage medium having computer readable program code embodied therewith, the computer readable program code comprising:
computer readable program code configured to receive a search query from a user having a predetermined access level;
computer readable program code configured to execute a search based on the search query;
computer readable program code configured to produce initial search results based on the executed search;
computer readable program code configured to redact sensitive information from the initial search results based on the predetermined access level;
computer readable program code configured to filter and re-order the redacted search results to forestall an inference of the redacted sensitive information; and
computer readable program code configured to display to a user the filtered and re-ordered search results.

13. The computer program product according to claim 12, wherein said filtering and re-ordering comprises re-ranking the redacted search results relative to a base search algorithm associated with said executing.

14. The computer program product according to claim 12, wherein said filtering and re-ordering comprises constructing a binary logic formula corresponding to the search query.

15. The computer program product according to claim 14, wherein:
the search query comprises at least one search term;
said constructing comprising representing each of the least one search term as a boolean literal.

16. The computer program product according to claim 15, wherein:
the initial search results comprise at least one document; and
the redacted search results comprise at least one redacted document, corresponding to at least one document from the initial search results.

17. The computer program product according to claim 16, wherein said redacting comprises identifying at least one keyword for redaction from the search query, and redacting the at least one keyword from at least one document of the initial search results.

18. The computer program product according to claim 17, wherein said filtering and re-ordering comprises setting a boolean literal of a search term to true if the search term is present in at least one document of the initial search results, else setting the boolean literal to false.

19. The computer program product according to claim 18, wherein said filtering and re-ordering comprises setting a boolean literal of a search term from the search query to false if the search term is redacted from the initial search results.

20. A method comprising:
receiving a search query from a user with a given access level;
executing a search based on the search query;
producing search results which omit information relative to the user's access level and which re-order the search results to forestall inference of missing information;
said producing comprising:
identifying at least one keyword for redaction from the search query, and redacting the at least one keyword from at least one document of the search results; and setting a boolean literal of a search term to true if the search term is present in at least one document of the search results, else setting the boolean literal to false.

* * * * *